Patented June 18, 1940

UNITED STATES PATENT OFFICE 2,205,021

PRODUCTION OF CONDENSATION PRODUCTS

Hermann Schuette, Mannheim, and Conrad Schoeller and Max Wittwer, Ludwigshafen-on-the-Rhine, Germany, assignors to I. G. Farbenindustrie Aktiengesellschaft, Frankfort-on-the-Main, Germany No Drawing. Original application November 2, 1934, Serial No. 751,182. Divided and this application October 7, 1937, Serial No. 167,774. In Germany November 10, 1933

10 Claims. (Cl. 260—457)

The present invention relates to new condensation products which are valuable especially as assistants for the textile and related industries and a process of producing the said products.

We have found that valuable condensation products which are readily dispersable in water (which term includes also products soluble in water) can be obtained by causing "polyhydric alcohol substances" (i. e. polyhydric alcohols or the corresponding oxides obtainable therefrom by intramolecular splitting off of water or polyethers obtainable therefrom by intramolecular splitting off of water from several molecules thereof) to react with organic compounds containing at least one SH-group if desired in the presence of catalysts, any free hydroxyl groups still present in the reaction product being caused to react with reactive compounds if desired. As initial materials may be mentioned especially the aliphatic, cycloaliphatic, aromatic or mixed aliphatic aromatic compounds containing one or more SH-groups which contain at least 6 carbon atoms in the molecule and also mercaptans which are substituted by halogen atoms, or nitro, sulphonic, carbonyl, ether or ester groups. For example ethyl, butyl, amyl, heptyl, octyl, dodecyl, cetyl, octodecyl, and oleyl mercaptans, 7.18-octodecane dimercaptan, cyclohexyl mercaptan, methylcyclohexyl mercaptan, thiophenols, thionaphthols, thiosalicyclic acid, para-nitro-thiophenol and benzyl mercaptan are suitable.

Ethylene glycol, glycerine, ethylene oxide, glycide compounds, polyglycol ethers or polyglycerines, for example, are caused to act on the said mercaptans. The nature and amount of the initial materials to be employed for the condensation depends on the nature of the desired final product. It is advantageous to employ the polyhydric alcohols or their oxides in such amounts or the polyglycol ethers of polyglycerines of such molecular sizes that at least one radicle containing 4 or 6 carbon atoms is introduced into the molecule of the initial materials containing the SH-groups. The condensation is effected at ordinary, or preferably at elevated, temperature, such as from about 80° to about 200° C., preferably between 100° and 150° C., if desired in a closed vessel under increased pressure for example from 1 to 18 atmospheres, and in the presence or absence of inert solvents or diluents, such as water, or aliphatic or aromatic hydrocarbons or halogenated hydrocarbons. It is advantageous to work in the presence of catalytically acting substances, such as caustic soda, caustic potash, sodium carbonate, ammonia, sodium ethylate, potassium ethylate or bleaching earths. The amounts of these substances used are preferably between 0.1 to 1 per cent by weight of the mercaptan employed.

According to the said process it is possible to introduce any high molecular ether radicle into the compounds containing the SH-group, depending on the amount of polyhydric alcohol or the like employed. In many cases it is also of advantage to cause different polyhydric alcohols, alkylene oxides or polyglycol ether radicles to act consecutively on the mercaptans. In order to introduce polyglycol or polyglycerine radicles into the mercaptans, the corresponding halogen compounds may also be employed. For example one molecular proportion of a mercaptan may first be brought into reaction with several molecular proportions of epichlorhydrin and then with the halogen compound of a polyglycerine radicle, or 1 molecular proportion of a mercaptan may be first caused to react with one or more molecular proportions of ethylene chlorhydrin and then with one or more molecular proportions of ethylene oxide or propylene oxide.

The products obtainable according to this invention are generally speaking soluble or readily dispersable in organic solvents, such as alcohol, ether, acetone, chloroform, benzine, benzene and nitrobenzene, oils and fats and water. They have, in a different degree depending on the initial materials selected and the amount of polyhydric alcohols or the like employed, a high wetting, foaming, washing and dispersing power as well as a protective colloid action, so that they may find wide employment in the textile, leather, lacquer, paper, rubber and like industries. For example they are suitable as additional agents in dyeing, printing, dressing, washing, fulling and other processes usual in the working up of textiles. The compounds obtainable according to this invention have a neutral reaction and are stable to electrolytes. They may therefore also be very advantageously employed in the manufacture of artificial silk as an addition to the spinning solutions or precipitating baths. By reason of their high emulsifying power and their good protective colloid action the products are also capable of advantageous employment in cosmetic, pharmaceutical and foodstuff industries.

The said products usually have a terminal free hydroxyl group and may therefore be caused to react with reactive compounds. For this purpose organic or inorganic acids, such as acetic acid, butyric acid, lauric acid, stearic acid, oleic acid, sulphopalmitic acid, naphthenic acids, naphthoic acids, sulphuric acid, chlorsulphonic acid, nitric acid and phosphoric acid may, for example, be employed. Further compounds which are suitable for such subsequent reaction are halogenparaffins, chlorocarbonic esters, chlorethane sulphonic acid and monochloracetic acid. The said condensation products may also be halogenated, in particular the terminal hydroxyl groups may be replaced by halogen atoms, the resulting halogen compounds then being caused to react with ammonia or amines or compounds containing hydroxyl groups or alcoholates. The products thus obtained constitute equally valuable assistants for the textile and related industries.

When the condensation products are used they may be combined with other suitable substances, and preparations may be made for this purpose which contain mixtures of these different substances. For example preparations containing the said condensation products together with soaps, saponine, sulphuric esters or true sulphonic acids of organic compounds, as for example Turkey red oils, sulphite cellulose waste liquor, sulphuric esters of alcohols of high molecular weight, reaction products of fatty acids or their derivatives or chlorocarbonic esters with taurine, hydroxyethane sulphonic acids or polypeptides, or polymerization products of ethylene oxide or condensation products of ethylene oxide with organic compounds which contain hydroxyl, carboxylic or amino groups in the molecule, glue, rubber-like substances, dextrine or cellulose ethers have very valuable properties. In many cases it is also of advantage to employ the new condensation products together with salts of inorganic or organic acids and bases, as for example hydroxides of monovalent or divalent metals, or amine as for example mono-, di- and triethanolamine or pyridine, or to add thereto for example common salt, Glauber's salt, waterglass, phosphates, sodium acetate or ethanolamine tartrate. Mixtures of the said condensation products with organic solvents, bleaching agents, such as perborates or alkali metal peroxides, or other substances may also be readily prepared and employed with advantage in practice.

The following examples will further illustrate the nature of this invention but the invention is not restricted to these examples.

Example 1

About 5 gram-molecules of ethylene oxide are caused to act in a closed vessel at 140° C. in the presence of about 0.5 per cent of sodium methylate on each gram-molecule of a dodecyl mercaptan obtained by the reaction of dedecyl bromide with sodium hydrosulphide. A viscous, liquid, practically odorless product is obtained which is soluble in water and which probably corresponds to the formula: $C_{12}H_{25}.S.CH_2.CH_2-(O.CH_2.CH_2)_3-O.CH_2.CH_2.OH$. It has a very high wetting power and an excellent emulsifying power for mineral oils, fatty oils and fats. It is eminently suitable for washing wool, especially in alkaline liquors. By treatment with sulphonating agents, a product is obtained which is eminently suitable as a wetting and dispersing agent for the textile and leather industries.

Example 2

About 10 gram-molecules of gaseous ethylene oxide are caused to act at about 120° C. in a stirring autoclave with each gram-molecule of oleyl mercaptan (obtainable by reacting oleyl bromide with sodium sulphhydrate) with an addition of 0.5 per cent of caustic soda of 40° Baumé strength. The resulting product which corresponds probably to about the following formula: $C_{18}H_{35}.S.CH_2.CH_2-(O.CH_2.CH_2)_8-O.CH_2.CH_2.OH$, has a salve-like nature; it is soluble in water and is suitable for example for the emulsification of olein. It also has a high dispersing power and prevents the precipitation of calcium soaps when employing soaps in hard water. The product may be employed with advantage as an additional substance to soaps, soap preparations, bath essences and hair preparations.

Example 3

20 gram-molecules of gaseous ethylene oxide are caused to act in a stirring autoclave at about 120° C. under a pressure of 5 atmospheres on each gram-molecule of cetyl mercaptan (obtainable by condensation of cetyl bromide with sodium sulphhydrate) in the presence of from about 0.5 to 1 per cent of caustic soda. A wax-like product corresponding probably to about the following formula: $C_{16}H_{33}.S.CH_2.CH_2-(O.CH_2.CH_2)_{18}-O.CH_2.CH_2.OH$, readily soluble in water, is thus obtained which may be very advantageously employed as a levelling agent in the dyeing of textiles with vat dyestuffs.

A product having similar properties is obtained by employing 20 gram-molecules of glycide instead of the ethylene oxide.

Example 4

1 molecular proportion of decylmercaptan (obtainable by the interaction of decylbromide and sodium hydrosulphide) is caused to react with 5 molecular proportions of ethylene oxide in the presence of 0.2 per cent of sodium methylate in a closed vessel at 160° C. The reaction product which is obtained in the form of a viscous yellow oil is readily soluble in water and yields strongly foaming aqueous solutions. Such solutions (for example a solution containing 2.25 grams of the said condensation product and 1 gram of calcined sodium carbonate per liter of water) are eminently suitable for washing woollen piece goods.

Example 5

1 molecular proportion of decylmercaptan is dissolved in a solution of 1 molecular proportion of potassium hydroxide in anhydrous ethyl alcohol. Polyglycerine chloride obtained from 1 molecular proportion of a polyglycerine of the molecular weight 520 and 1 molecular proportion of hydrogen chloride is allowed to flow slowly into the said solution at about from 75° to 80° C. while stirring under reflux-condensation. The reaction mixture is stirred for some more hours at the same temperature whereupon the potassium chloride precipitated is separated off and the ethyl alcohol removed by distillation. The brownish sirupy reaction product is readily soluble in water and yields strongly foaming and well wetting aqueous solutions. Such solutions (for example a solution containing 2 grams of the said condensation product per liter) are most suitable for washing wool containing suint whereby white loose wool is obtained Products of similar properties are obtained if dodecylmercaptan instead of decylmercaptan is reacted with polyglycerine chloride in the manner set forth above.

*Example 6*

If 1 molecular proportion of epichlorhydrin is reacted with the alcoholic solution of 1 molecular proportion of the potassium salt of decylmercaptan in an analogous manner as described in the preceding example, after separating the potassium chloride precipitated and after removal of the alcohol a semi-solid wax-like reaction product is obtained which may be used with advantage in the preparation of creams and ointments.

For instance from 1.5 parts by weight of the said reaction product, 4 parts of cetyl alcohol, 3 parts of wool fat, 3 parts of soft paraffin, 7 parts of Vaseline, 1 part of glycerine and 30 parts of water a very good cream for the skin may be obtained.

If 1 molecular proportion of chlorosulphonic acid is allowed to act on an etherial solution of 1 molecular proportion of the reaction product obtained according to the first paragraph of the present example, after removal of the hydrogen chloride and of the ether a water-soluble acid sulphuric acid ester is obtained which after neutralization with diluted solutions of alkali hydroxide or with an organic amine may be employed with advantage as a washing and cleansing agent.

This application is a division of application Ser. No. 751,182, filed November 2, 1934.

What we claim is:

1. The process of producing high molecular condensation products which comprises causing a substance selected from the group consisting of polyalcylene glycols and polyglycerines to react with a substance containing at least 6 carbon atoms and selected from the group consisting of aliphatic, cycloaliphatic, and mixed aliphatic-aromatic mercaptans and of thiophenols and thionaphthols.

2. The process of producing high molecular condensation products which comprises causing a substance selected from the group consisting of polyalkylene glycols and polyglycerines to react with a substance containing at least 6 carbon atoms and selected from the group consisting of aliphatic, cycloaliphatic, and mixed aliphatic-aromatic mercaptans and of thiophenols and thionaphthols, and esterifying the free hydroxyl groups present in the reaction product with an acid selected from the class consisting of inorganic and organic acids.

3. The process of producing high molecular condensation products which comprises causing a substance selected from the group consisting of polyalkylene glycols and polyglycerines to react with a substance containing at least 6 carbon atoms and selected from the group consisting of aliphatic, cycloaliphatic, and mixed aliphatic-aromatic mercaptans and of thiophenols and thionaphthols, in the presence of a non-acid catalyst.

4. The process of producing high molecular condensation products which comprises causing a substance selected from the group consisting of polyalkylene glycols and polyglycerines to react with a substance containing at least 6 carbon atoms and selected from the group consisting of aliphatic, cycloaliphatic, and mixed aliphatic-aromatic mercaptans and of thiophenols and thionaphthols, at a temperature between about 80° C. and about 200° C.

5. The process of producing high molecular condensation products which comprises causing a substance selected from the group consisting of polyalkylene glycols and polyglycerines to react with a substance containing at least 6 carbon atoms and selected from the group consisting of aliphatic, cycloaliphatic, and mixed aliphatic-aromatic mercaptans and of thiophenols and thionaphthols, at a temperature between about 100° C. and about 150° C.

6. The process of producing high molecular condensation products which comprises causing a substance selected from the group consisting of polyalkylene glycols and polyglycerines to react with a substance containing at least 6 carbon atoms and selected from the group consisting of aliphatic, cycloaliphatic, and mixed aliphatic-aromatic mercaptans and of thiophenols and thionaphthols, in a closed vessel.

7. Condensation products of a substance selected from the group consisting of polyalkylene glycols and polyglycerines with a substance containing at least 6 carbon atoms and selected from the group consisting of aliphatic, cycloaliphatic, and mixed aliphatic-aromatic mercaptans and of thiophenols and thionaphthols.

8. Condensation products of a substance selected from the group consisting of polyalkylene glycols and polyglycerines with a substance containing at least 6 carbon atoms and selected from the group consisting of aliphatic, cycloaliphatic, and mixed aliphatic-aromatic mercaptans and of thiophenols and thionaphthols, the radical of an acid selected from the class consisting of inorganic and organic acids being attached to an oxygen atom of a hydroxyl group of the molcule of the said condensation product.

9. As new products thioethers of the general formula R-S-R', wherein R is an organic radical containing at least 6 carbon atoms selected from the group consisting of aliphatic, cycloaliphatic, aromatic and mixed aliphatic-aromatic radicals, and R' is polyalkylene glycol ether radical.

10. As new products thioethers of the general formula R-S-R', wherein R is an organic radical containing at least 6 carbon atoms selected from the group consisting of aliphatic, cycloaliphatic, aromatic and mixed aliphatic-aromatic radicals, and R' is polyethylene glycol ether radical.

HERMANN SCHUETTE.
CONRAD SCHOELLER.
MAX WITTWER.